US011630091B2

(12) United States Patent
Bae et al.

(10) Patent No.: US 11,630,091 B2
(45) Date of Patent: Apr. 18, 2023

(54) ON-LINE SYSTEM FOR IMPROVING DETECTION LEVEL OF ANALYTES BY LIQUID CHROMATOGRAPHY AND ANALYSIS METHOD USING SAME

(71) Applicant: LG Chem, Ltd., Seoul (KR)

(72) Inventors: Yongjin Bae, Daejeon (KR); Young Hee Lim, Daejeon (KR); Yeu Young Youn, Daejeon (KR); Hyun Sik You, Daejeon (KR); Bomee Jang, Daejeon (KR)

(73) Assignee: LG Chem, Ltd.

( * ) Notice: Subject to any disclaimer, the term of this patent is extended or adjusted under 35 U.S.C. 154(b) by 73 days.

(21) Appl. No.: 17/246,935

(22) Filed: May 3, 2021

(65) Prior Publication Data

US 2021/0356442 A1   Nov. 18, 2021

(30) Foreign Application Priority Data

May 14, 2020   (KR) .................. 10-2020-0057448
Dec. 22, 2020   (KR) .................. 10-2020-0181039

(51) Int. Cl.
  *G01N 30/32*   (2006.01)
  *G01N 30/46*   (2006.01)
  *G01N 30/02*   (2006.01)

(52) U.S. Cl.
  CPC ........... *G01N 30/468* (2013.01); *G01N 30/32* (2013.01); *G01N 30/461* (2013.01); *G01N 2030/027* (2013.01); *G01N 2030/326* (2013.01)

(58) Field of Classification Search
  CPC .... G01N 30/468; G01N 30/32; G01N 30/461; G01N 2030/027; G01N 2030/326; G01N 30/46
  See application file for complete search history.

(56) References Cited

U.S. PATENT DOCUMENTS

2002/0146349 A1    10/2002   Gygi et al.
2002/0150926 A1*   10/2002   Jindal .................. G01N 30/463
                                                    435/7.1

(Continued)

FOREIGN PATENT DOCUMENTS

EP          00892267 A1    1/1999
JP          H1137985 A     2/1999
(Continued)

OTHER PUBLICATIONS

Extended European Search Report including Written Opinion for Application No. 21168077.2 dated Oct. 7, 2021, pp. 1-8.

*Primary Examiner* — David J Bolduc
(74) *Attorney, Agent, or Firm* — Lerner David LLP

(57) ABSTRACT

An on-line system that performs concentration and solvent exchange in order to improve a detection level of analytes by a liquid chromatograph (LC) is provided. The on-line system comprises: a first pump and a second pump for supplying a solvent; a liquid chromatograph (LC) including a separation column (SC) connected to the first pump; a trapping column (TC) for collecting the analytes separated from the separation column; a concentration column (CC) for concentrating the analytes collected in the trapping column (TC); a detector; and first to third switching valves that communicate fluid with at least one of the first or second pumps. An analysis method using the same is also provided.

15 Claims, 3 Drawing Sheets
(2 of 3 Drawing Sheet(s) Filed in Color)

(56) References Cited

U.S. PATENT DOCUMENTS

| | | |
|---|---|---|
| 2003/0168392 A1 | 9/2003 | Masuda et al. |
| 2004/0005633 A1* | 1/2004 | Vandekerckhove ............... G01N 33/6842 435/68.1 |
| 2004/0035183 A1* | 2/2004 | O'Brien ............... G01N 1/2202 73/431 |
| 2004/0173509 A1 | 9/2004 | Ito et al. |
| 2005/0218055 A1* | 10/2005 | Hayashi ............... G01N 30/463 210/198.2 |
| 2006/0144126 A1* | 7/2006 | O'Brien ............... G01N 21/51 73/28.01 |
| 2007/0029477 A1* | 2/2007 | Miller ............... G01N 30/7206 250/290 |
| 2007/0065343 A1* | 3/2007 | Srinivasan ............ G01N 30/462 422/70 |
| 2007/0199874 A1* | 8/2007 | Ito ............... G01N 30/463 422/63 |
| 2008/0229810 A1* | 9/2008 | Swart ............... G01N 30/88 73/61.55 |
| 2008/0245715 A1 | 10/2008 | Iwata |
| 2009/0294363 A1* | 12/2009 | Liu ............... G01N 30/34 210/96.1 |
| 2010/0000301 A1 | 1/2010 | Iwata |
| 2010/0107742 A1 | 5/2010 | Liu et al. |
| 2011/0097813 A1* | 4/2011 | Ito ............... G01N 30/463 210/659 |
| 2014/0178979 A1 | 6/2014 | Herman et al. |
| 2014/0298990 A1* | 10/2014 | Fan ............... G01N 30/461 96/102 |
| 2014/0305195 A1* | 10/2014 | Blaschyk ............... G01N 30/74 73/61.56 |
| 2015/0000416 A1* | 1/2015 | Baeuerle ............... B01D 57/02 73/717 |
| 2015/0346166 A1* | 12/2015 | Morikawa ............... G01N 30/84 73/61.55 |
| 2016/0305919 A1 | 10/2016 | Staples |
| 2016/0334375 A1* | 11/2016 | Herman ............... G01N 30/02 |
| 2018/0128792 A1* | 5/2018 | Wachinger ............... G01N 30/24 |

FOREIGN PATENT DOCUMENTS

| | | |
|---|---|---|
| JP | 2004271272 A | 9/2004 |
| JP | 2008256429 A | 10/2008 |

* cited by examiner

[FIG. 1]
(a) LC mode
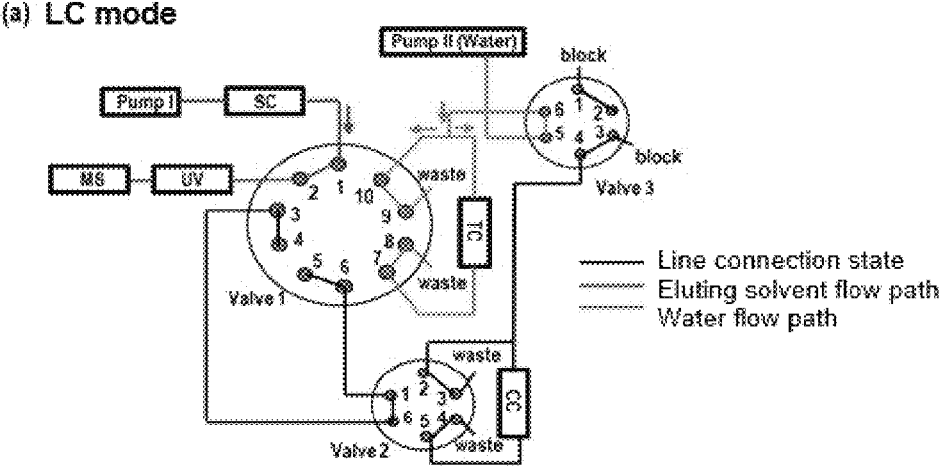
(b) Trapping mode
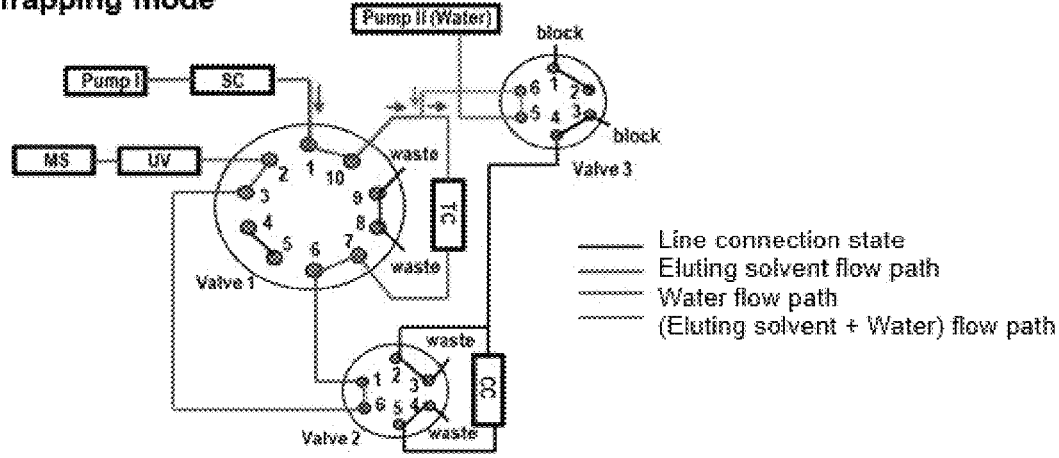
(c) Concentration mode
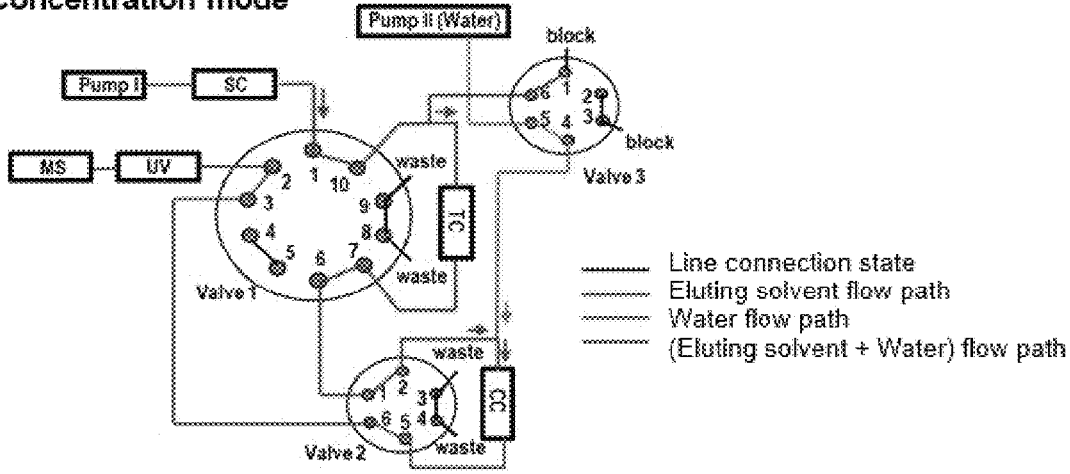

[FIG. 2]
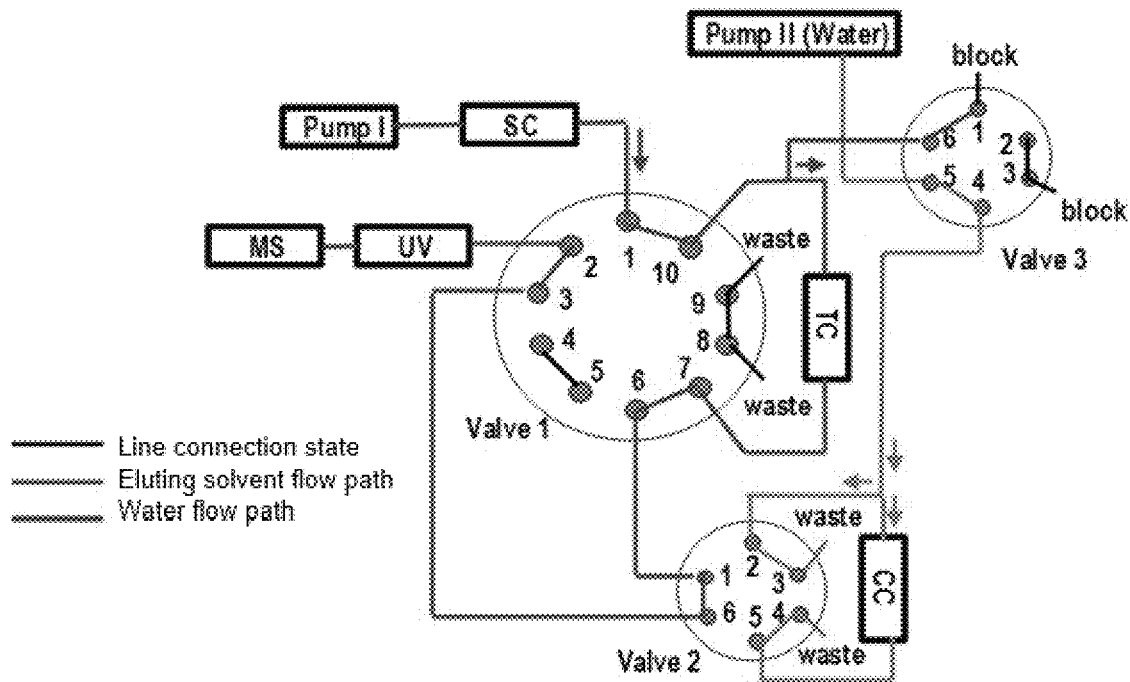
[FIG. 3]
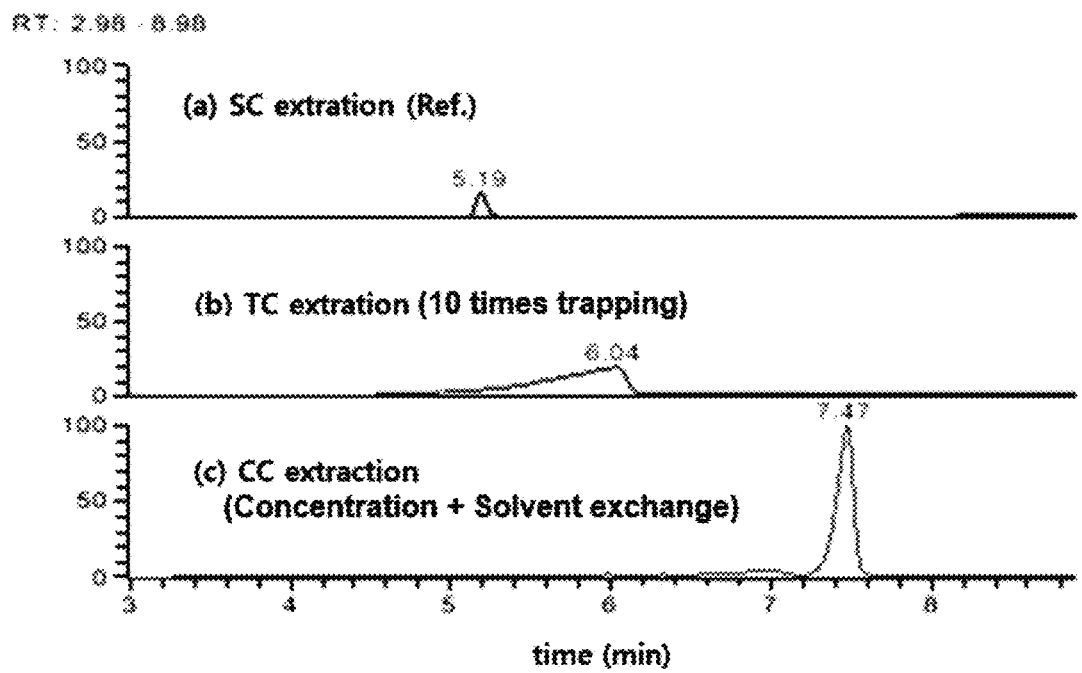

[FIG. 4]
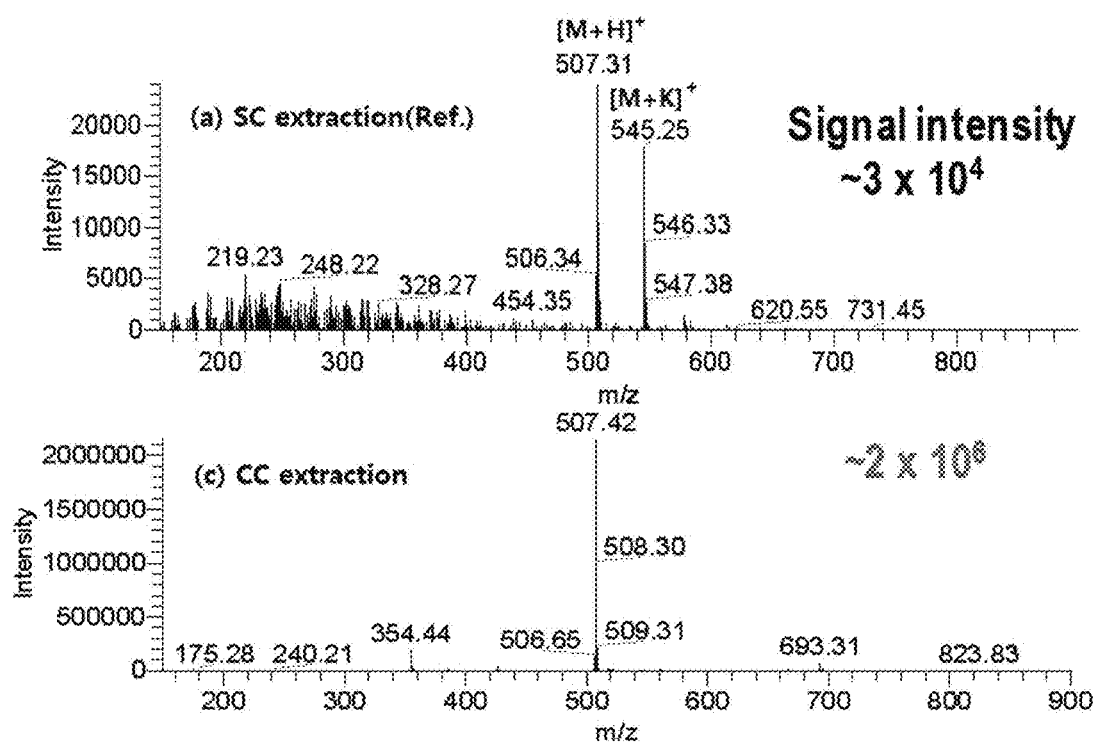

ON-LINE SYSTEM FOR IMPROVING DETECTION LEVEL OF ANALYTES BY LIQUID CHROMATOGRAPHY AND ANALYSIS METHOD USING SAME

CROSS-REFERENCE TO RELATED APPLICATIONS

The present application claims the benefit of priority based on Korean Patent Application No. 10-2020-0057448 filed on May 14, 2020 and Korean Patent Application No. 10-2020-0181039 filed on Dec. 22, 2020, and all contents disclosed in the patent document are included as a part of this specification.

TECHNICAL FIELD

The present invention relates to an on-line analysis system based on a liquid chromatograph (LC) and an analysis method using the same, and more specifically, is directed to an on-line system that can perform concentration and solvent exchange in order to improve a detection level of analytes by the LC, and an analysis method using the same.

BACKGROUND OF THE INVENTION

A liquid chromatograph (LC) is configured to pass a sample through a separation column, separate components in the sample from each other by using the fact that the interactions with the column is different for each component of the sample, and detect the separated components through a device such as a UV and a MS.

Such LC/UV or LC/MS is usefully employed for a component analysis of a mixture sample, particularly for an analysis of impurities in the sample. However, when the impurities are present in a trace amount, it is difficult to detect them with a general LC/MS, and thus a method of increasing concentration or ionization efficiency is required in order to improve the detection capability of the trace impurities.

Wide varieties of methods that use a fraction collector, a solid phase extraction (SPE), and a large volume injection (LVI) have been developed to enhance the detection level by concentrating trace components in a mixture.

The fraction collector is used in combination with the LC. In the fraction collector, a solute separated through the LC column is repeatedly collected in a vial according to an elution time, and concentrated by volatilizing a solvent. The method of using such a fraction collector requires a pretreatment process to volatilize the solvent for concentration, and since the process after the fractionation is not automated, there is a possibility of loss of the sample during the introduction to a mass spectrometer after the concentration.

The SPE traps a material to be analyzed and then extracts, if necessary. The SPE has an advantage that it takes less time to volatilize a solvent, but it requires various types of cartridges for trapping and a separate device for automation.

The LVI is configured to separate a sample on an LC column by injecting a large amount of the sample at once using a needle and a sample loop having a large capacity. In this case, the analytes can be concentrated is in an on-column focusing manner. The term "on-column focusing" refers to a phenomenon that, when a solution in which a solute is dissolved in a non-eluting solvent is injected into the column, the solute is gathered at the beginning of the column as the solute does not pass through the column and only the solvent exits the column. According to the LVI using such on-column focusing, most of the sample can be concentrated in such a way that it is trapped at a front part of the column, and the concentration and the mass spectrometry can be automated in on-line. However, in case the analytes and the solvent do not satisfy the on-column focusing condition, it may be difficult to apply the LVI. For example, in the on-column focusing, the sample must be dissolved in a solvent having a low elution intensity, but, in case of an OLED sample, a solvent that is well soluble in the sample is used for analyzing the trace components and such a solvent has a high elution intensity, which is difficult to apply the LVI.

Further, since the solvent used to separate a mixture in the LC is not advantageous for ionization, it is not effective for the mass spectrometry (MS) in some cases.

Therefore, there is required to develop an automated system that can enhance the detection efficiency by improving the disadvantages of the existing component concentration method to effectively concentrate the analytes separated by the LC and solving a mismatch of the solvent conditions used in the LC and the MS.

SUMMARY OF THE INVENTION

An object of the present invention is to improve a detection level of analytes by a LC. Further, an object of the present invention is to provide an automated system that can concentrate materials regardless of kinds thereof so long as they can be separated by the LC, and further exchange a solvent for the LC separation for a solvent advantageous for a mass spectrometry; and an analysis method using the same.

According to an aspect of the present invention, an on-line system for improving detection level of analytes by a liquid chromatograph (LC) is provided, the on-line system comprising:

a first pump and a second pump for supplying a solvent;

a liquid chromatograph (LC) including a separation column (SC) connected to the first pump;

a trapping column (TC) for collecting the analytes separated from the separation column;

a concentration column (CC) for concentrating the analytes collected in the trapping column (TC);

a detector; and first to third switching valves that communicate fluid with at least one of the first and second pumps, the separation column (SC), the trapping column (TC), the concentration column (CC) and the detector, and have a plurality of ports, wherein the first to third switching valves are connected to each other through a flow path and switch the fluid flow to an LC mode, a trapping mode and a concentration mode by changing connection states of the ports included in each of the switching valves, wherein a first eluting solvent in the LC mode is supplied to the separation column (SC) through the first pump to separate the analytes, and then the LC mode is sequentially switched to the trapping mode and the concentration mode, and a solvent having an elution intensity lower than that of the first eluting solvent can be supplied to the trapping column (TC) and the concentration column (CC) through the second pump to trap and concentrate the analytes moving by flow of the first eluting solvent.

Further, after the trapping and concentration, the first pump supplies a second eluting solvent for ionizing the analytes through a solvent exchange, whereas operation of the second pump is stopped so that the analytes concentrated in the concentration column (CC) by the second eluting solvent can be detected by introducing them into the detector.

According to the other aspect of the present invention, the present invention provides a method for analyzing trace components in a mixture by a LC using the above on-line system, the method specifically comprising the steps of:

(S1) in a LC mode of the on-line system, after passing a mixture sample through a separation column (SC) to separate and detect it with a first eluting solvent and checking a retention time (RT) of trace components to be analyzed in the sample in the separation column from the detection result, setting a time (t1) at which the trace components starts to exit the separation column (SC) and a time (t2) at which they completely exit the separation column (SC);

(S2) at the start of the time (t1), switching the on-line system to a trapping mode and additionally supplying a solvent having an elution intensity lower than that of the first eluting solvent to a flow path directing to a trapping column (TC), so that the trace components in the sample exiting the separation column (SC) are collected in the trapping column (TC) until the time (t2) by the solvent having the lower elution intensity (trapping step); and (S3) after completing the trapping step, switching the on-line system to a concentration mode and additionally supplying the solvent having the lower elution intensity to a flow path directing to a concentration column (CC), so that the trace components trapped in the trapping column (TC) are concentrated in the concentration column (CC).

Additionally, the method of the present invention may further comprise the step of, after concentration of the trace components, supplying a second eluting solvent for ionizing the trace components to the concentration column (CC) through the separation column (SC) and the trapping column (TC) to exchange the first eluting solvent filled in the above columns and their connection flow paths with the second eluting solvent, so that the trace components concentrated by the second eluting solvent are detected by introducing them into the detector.

Furthermore, the present invention relates to an on-line system for improving a detection level of analytes by a liquid chromatograph (LC), the on-line system comprising:

a first pump and a second pump for supplying a solvent;
a liquid chromatograph (LC) including a separation column (SC) connected to the first pump;
a trapping column (TC) for collecting the analytes separated from the separation column;
a detector; and
switching valves that communicate fluid with at least one of the first and second pumps, the separation column (SC), the trapping column (TC) and the detector, and have a plurality of ports,
wherein the switching valves are connected to each other through a flow path and switch the fluid flow to an LC mode and a trapping mode by changing connection states of the ports included in each of the switching valves,
wherein a first eluting solvent in the LC mode is supplied to the separation column (SC) through the first pump to separate the analytes, and then the LC mode is switched to the trapping mode, and a solvent having an elution intensity lower than that of the first eluting solvent can be supplied to the trapping column (TC) through the second pump to trap the analytes moving by flow of the first eluting solvent.

EFFECT OF THE INVENTION

According to a LC on-line system of the present invention, after separation of analytes using switching of a fluid, concentration and solvent exchange are continuously performed through a trapping in on-line so that the concentrated analytes can be introduced into a detector without a loss thereof. Such an on-line system can be particularly useful for the analysis of components, such as impurities, that are present in a trace amount in a mixture.

Further, if the on-line system of the present invention is utilized, any materials that can be separated by the LC can be concentrated regardless of types thereof, and no separate pre-treatment is required for the concentrated analytes, which results in achieving effects such as shortening the analysis time and minimizing laboratory contamination.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 is a diagram illustrating an on-line system and an operation mode thereof according to an embodiment of the present invention.

FIG. 2 is a diagram illustrating line connection states and flow paths for solvent exchange in an on-line system according to an embodiment of the present invention.

FIG. 3 shows an LC/UV chromatogram (detection wavelength: 280 nm) of trace components in a mixture analyzed according to an operation mode of an on-line system in an embodiment of the present invention.

FIG. 4 shows a mass spectrum of trace components in a mixture analyzed according to an operation mode of an on-line system in an embodiment of the present invention.

DETAILED DESCRIPTION

Hereinafter, the terms or words used in this specification and claims should not be construed to be limited to their usual or dictionary meanings, and should be interpreted as meanings and concepts consistent with the technical idea of the present invention, based on the principle that the inventors can properly define the concepts of those terms in order to explain his/her own invention in the best way.

An embodiment of the present invention relates to an on-line system capable of performing concentration and solvent exchange in order to improve a detection level of analytes by a liquid chromatograph (LC).

The on-line system according to an embodiment of the present invention may comprise a liquid chromatograph (LC), a detector, two pumps, three columns, and three switching valves.

FIG. 1 shows an example of an on-line system according to the present invention. The above system comprises: a first pump and a second pump for supplying a solvent; a liquid chromatograph (LC) including a separation column (SC) connected to the first pump; a trapping column (TC) for collecting analytes separated from the separation column; a concentration column (CC) for concentrating the analytes collected in the trapping column (TC); an UV detector and a mass spectrometry detector (MS) as a detector; and first to third switching valves. Hereinafter, each configuration will be described with reference to FIG. 1.

The first pump is connected to the liquid chromatograph (LC) to supply an eluting solvent for separation of the analytes, and controls its operation by a LC/MS driving software. On the other hand, the second pump is installed outside the LC, and supplies a solvent having a lower elution intensity, for example, water in case of a reverse phase liquid chromatography, to a front end of the trapping column (TC) and the concentration column (CC), so that materials to be concentrated can be effectively trapped and concentrated in the trapping column (TC) and the concentration column (CC).

The separation column (SC), the trapping column (TC) and the concentration column (CC) are configured in a serial manner to enable fluid communication, whereby the eluting solvent supplied from the first pump can be sequentially moved to implement automation of the on-line system.

In general, any of the three columns may be used as long as they are employed to the liquid chromatograph, and types of the columns used in each mode may be the same or different. For example, in the reverse phase liquid chromatography, the separation column (SC), the trapping column (TC) and the concentration column (CC) use C18 in all, or the separation column uses C18 and the trapping and concentration columns use C30, which is advantageous for collecting the analytes. In addition, when the solvent is exchanged to increase an ionization efficiency, C8 may be used as the concentration column. In this case, more solvents such as water can be supplied from the second pump to improve the concentration effect. As such, in the on-line system of the present invention, the three columns can be appropriately selected according to the user's purpose.

The first to third switching valves are connected to each other through the flow path, and communicate fluid with at least one of the first and second pumps, the separation column (SC), the trapping column (TC), the concentration column (CC) and the detector. To this end, the switching valves are provided with a plurality of ports. The fluid flow in the on-line system can be switched to the LC mode, the trapping mode and the concentration mode by changing connection states of the ports included in each of the switching valves.

Concretely, the first switching valve may have 10 ports and the second and third switching valves may have 6 ports, respectively, wherein the ports may be arranged at regular intervals around each of the valves.

The first switching valve may include a port in fluid communication with the separation column, a port in fluid communication with the detector, a port in fluid communication with the second switching valve, a port in fluid communication with the trapping column (TC), and a port for disposal of components other than the analytes and solvents.

The second switching valve may include a port in fluid communication with the first switching valve, a port in fluid communication with the concentration column (CC), and a port for disposal of components other than the analytes and solvents.

The third switching valve may include a port in fluid communication with the second switching valve and the concentration column (CC), a port in fluid communication with the second pump, and a port in fluid communication with the first switching valve and the trapping column (TC), and the like.

The fluid flow in the on-line system by changing the connection states of the ports included in each of the switching valves will be described in more detail as follows. In the LC mode (a) of FIG. 1, the ports 1 and 2 of the first switching valve are connected to each other and the analytes are separated while the first eluting solvent for the LC supplied through the first pump passes through the separation column (SC), and then the separated analytes and the first eluting solvent can be introduced into the detector such as the UV and the MS directly along the flow path connected to the ports 1 and 2 of the first switching valve. Meanwhile, a solvent having a lower elution intensity than that of the first eluting solvent, such as water, can be supplied through the second pump. After the solvent having the lower elution intensity passes the flow path connected to the ports 9 and 10 of the first switching valve or the trapping column (TC) through the flow path connected to the ports 5 and 6 of the third switching valve, it may be discarded along the flow path connected to the ports 7 and 8 of the first switching valve.

In the trapping mode (b) of FIG. 1, the fluid flow is changed by connecting the ports 1 and 10 of the first switching valve, the ports 1 and 6 of the second switching valve, and the ports 5 and 6 of the third switching valve at a point of time when the analytes pass through the separation column (SC). Due to the changed fluid flow, while the analytes and the first eluting solvent flow into the trapping column (TC) along the flow path connected to the port 10 of the first switching valve, the solvent having the lower elution intensity supplied by the second pump flows into the trapping column (TC) through the flow path connected to the ports 5 and 6 of the third switching valve, so that the analytes are collected in the trapping column (TC) by the solvent having the lower elution intensity. Meanwhile, the first eluting solvent and the solvent having the lower elution intensity pass through the trapping column (TC), and are detected by flowing them into the detector along the flow path connected to the ports 6 and 7 of the first switching valve, the flow path connected to the ports 1 and 6 of the second switching valve, and the flow path connected to the ports 2 and 3 of the first switching valve. From the detected result, it can be determined whether or not the analytes are trapped in the trapping column. That is, if the analytes are trapped effectively, the analytes will not be detected by the detector.

As such, after the analytes are separated by the first eluting solvent, the process of trapping the analytes by additionally supplying the solvent with the lower elution intensity such as water to the moving fluid flow may be repeated several times in order to trap more analytes, for example, it may be performed continuously by repeating 2 to 30 times.

In the concentration mode (c) of FIG. 1, the fluid flow is changed by connecting the ports 1 and 10 of the first switching valve, the ports 1 and 2 of the second switching valve and the ports 4 and 5 of the third switching valve. By the changed fluid flow, while the analytes collected in the trapping column (TC) are introduced into the concentration column (CC) along the flow path connected to the ports 6 and 7 of the first switching valve and the flow path connected to the ports 1 and 2 of the second switching valve, the solvent with the lower elution intensity supplied by the second pump flows into the concentration column (CC) through the flow path connected to the ports 4 and 5 of the third switching valve, so that the analytes are concentrated in the concentration column (CC) by the solvent of the lower elution intensity. Meanwhile, the solvent of the lower elution intensity and the first eluting solvent pass through the concentration column (CC), and are detected by introducing them into the detector along the flow path connected to the ports 5 and 6 of the second switching valve and the flow path connected to the ports 2 and 3 of the first switching valve. From the detected result, it can be determined whether or not the analytes are concentrated in the concentration column. That is, if the analytes are concentrated effectively, the analytes will not be detected.

In this concentration mode, the analytes can be concentrated in the concentration column (CC) according to an on-column focusing manner by additionally supplying the solvent with the lower elution intensity to the fluid flow, similar to the trapping mode. Any materials that can be separated by the LC can be concentrated regardless of type thereof. In addition, since the analytes can be eluted with a small amount of the solvent while they are concentrated in the concentration column, the time and cost required for pre-treatment are less than those of the concentration using a conventional fraction collector. Further, the concentration of the analytes is performed in on-line, so no harmful solvents are exposed to the atmosphere, reducing laboratory contamination.

Meanwhile, as a flow rate of the solvent having the lower elution intensity supplied through the second pump in the trapping and concentration modes increases, an effect of the on-column focusing is high, but a pressure applied to the separation column is increased excessively if the flow rate of the solvent having the lower elution intensity is too large, whereby it is difficult to perform the experiment itself or there is a risk that the analytes will precipitate in the line. Therefore, it may be necessary to appropriately control the flow rate of the solvent having the lower elution intensity. For example, while the eluting solvent may be supplied at a flow rate of 0.1 to 2 ml/min, for example, 1 ml/min, the solvent with the lower elution intensity such as water may be supplied at a flow rate of less than 0.5 ml/min, for example, 0.25 to 0.35 ml/min.

In the on-line system of the present invention, since the trapping and concentration are performed by flowing the eluting solvent through the three columns and adding water in the middle, significant pressure may be applied to the column and the flow path. Accordingly, it is advantageous to set up a flow path that can withstand the pressure when configuring the system.

Further, the on-line system according to an embodiment of the present invention may perform solvent exchange to improve an ionization efficiency of the analytes after the concentration mode.

FIG. 2 is a diagram illustrating a line connection state and a flow path for solvent exchange in an on-line system according to an embodiment of the present invention.

Referring to FIG. 2, after the concentration mode, the fluid flow is switched by connecting ports 1 and 10 of the first switching valve and ports 1 and 6 of the second switching valve to supply a second eluting solvent that is advantageous for ionization of the concentrated analytes through solvent exchange in the first pump. While the eluting solvent is exchanged in the flow path including the separation column (SC) and the trapping column (TC), the flow path between the trapping column (TC) and the concentration column (CC) is blocked, and a solvent having a lower elution intensity such as water is supplied to the concentration column (CC) to minimize a possibility of spreading the analytes within the concentration column, thereby stabilizing the concentration and preventing a problem that the analytes are eluted in the solvent exchange process. Next time, after switching the port connection of the second switching valve to the ports 1-2 to create the fluid flow of the same flow path as that of the concentration mode, the second pump and the third switching module are shut off to supply the second eluting solvent to the concentration column (CC).

Since the first eluting solvent (the eluting solvent for the LC separation) is not suitable for ionization, it is possible to overcome a disadvantage of adversely acting in terms of detection level during a mass spectrometry.

For example, tetrahydrofuran (THF), one of the solvents mainly used for the LC separation of an OLED sample, has a higher proton affinity compared to the solvent such as water or acetonitrile (AN), thereby being capable of reducing the ionization efficiency by a proton transfer reaction. Such THF is not effective in the mass spectrometry that detects ions generated by ionizing the analytes. If the LC conditions are changed to use a suitable solvent for ionization, it will take a lot of time and cost.

Therefore, according to the present invention, trace components in the mixture sample are separated and concentrated in the on-line system under conditions suitable for the LC separation, and then a second eluting solvent suitable for ionization is supplied to the concentration column (CC) through the separation column (SC) and the trapping column (TC) by solvent exchange in the first pump to elute the concentrated components and perform the mass spectrometry, which results in improving the detection efficiency.

According to the present invention, the first eluting solvent, the second eluting solvent and the solvent having the lower elution intensity may be appropriately selected depending on materials to be analyzed without any particular limitation. As an example, if the analysis target is an OLED sample, the first eluting solvent may be AN/THF and $H_2O$/AN, the second eluting solvent for ionization may be AN/TFA and $H_2O$/TFA, and the solvent having the lower elution intensity may be water.

The on-line system of the present invention as described above can be usefully employed for the analysis of components, such as impurities, present in trace amounts in the mixture.

Accordingly, the present invention further provides a method for analyzing trace components in a mixture by a LC using the on-line system. The above method specifically comprises the following steps.

(S1) in a LC mode of the on-line system, after passing a mixture sample through a separation column (SC) to separate and detect it with a first eluting solvent and checking a retention time (RT) of trace components to be analyzed in the sample in the separation column from the detection result, setting a time (t1) at which the trace components starts to exit the separation column (SC) and a time (t2) at which they completely exit the separation column (SC);

(S2) at the start of the time (t1), switching the on-line system to a trapping mode and additionally supplying a solvent having an elution intensity lower than that of the first eluting solvent to a flow path directing to a trapping column (TC), so that the trace components in the sample exiting the separation column (SC) are collected in the trapping column (TC) until the time (t2) by the solvent having the lower elution intensity (trapping step); and (S3) after completing the trapping step, switching the on-line system to a concentration mode and additionally supplying the solvent having the lower elution intensity to a flow path directing to a concentration column (CC), so that the trace components trapped in the trapping column (TC) are concentrated in the concentration column (CC).

Prior to the step (S1), a blank run step for stabilization may be additionally performed on the separation column (SC).

In the step (S1), t1 and t2 may be set based on a time when analytes are detected in the LC mode. For example, considering a peak width on a LC chromatogram and a delay time due to the switching connection of flow paths on the on-line system, t1=RT−0.2 min and t2=RT+0.2 min may be set, respectively, based on the retention time (RT) of the analytes.

In the step (S2), the trapping may be repeatedly performed as many times as desired, and be performed continuously, for example, 2 to 30 times.

Meanwhile, at a time other than t1 to t2, the on-line system switches the port connection state of the first switching valve from 1-10 to 1-2. Since the on-line system of the present invention traps and concentrates some of the material separated from the separation column (SC), some of the material separated from the SC is transferred to the trapping column (TC) at a time between t1 and t2, and the port connection must be switched before t1 and after t2, so that other materials are not injected into the TC as they exit the SC. In addition, this switching of the port connection can prevent a problem of leakage of the materials trapped in the TC when the eluting solvent is continuously injected into the TC even if other materials are separated from the SC and do not come out the SC. Further, since materials that are eluted and come out at a time other than t1 to t2 are detected through ports 1-2 of the first switching valve, it is possible to monitor a trapping status in real time by checking whether materials to be trapped are detected.

In the step (S3), the trapped trace components exit the trapping column (TC) and are concentrated in the concentration column (CC). A time (t3) at which the trace components completely exit the trapping column (TC) may be set in consideration of whether a mass spectrum is detected as in t1 and t2. For example, since t3 is set by adding about 1 to 1.5 minutes to the retention time (RT) confirmed in the LC mode, it may be in the range of RT+1 minute to RT+1.5 minutes. Accordingly, the time during which the trace components exit the trapping column (TC) and are concentrated can be appropriately selected and optimized by an experimental person according to types of the analyzer and the column.

Further, the analysis method of the present invention may further comprise the step of, after concentration of the trace components, supplying a second eluting solvent for ionizing the trace components to the concentration column (CC) through the separation column (SC) and the trapping column (TC) to exchange the first eluting solvent filled in the above columns and their connection flow paths with the second eluting solvent, so that the trace components concentrated by the second eluting solvent are detected by introducing them into the detector. Specifically, the solvent exchange is performed to improve the ionization efficiency of the concentrated trace components. The trace components are eluted by the second eluting solvent for ionization supplied to the concentration column (CC) through the separation column (SC) and the trapping column (TC) by the first pump, and is detected by introducing them into the detector such as a MS.

In the detection step, while the second eluting solvent is exchanged by supplying it from the flow path including the separation column (SC) and the trapping column (TC), the flow path between the trapping column (TC) and the concentration column (CC) is blocked, and a solvent having a lower elution intensity such as water is supplied to the concentration column (CC) to perform stabilization of the concentration that minimizes a possibility of spreading the analytes inside the concentration column, thereby preventing a problem that the analytes are eluted in the solvent exchange process.

As described above, the present invention is characterized in that the solvent having the lower elution intensity is additionally used in order to trap only specific materials among the separated components after separating an analysis sample in the separation column (SC) using a first eluting solvent. That is, since the first eluting solvent used in the LC mode has a high elution intensity, it is difficult to perform an on-column focusing even if an injection amount of the sample is increased. For this reason, the trapping of specific materials using the on-column focusing is performed by flowing the solvent having the lower elution intensity between the separation column (SC) and the trapping column (TC). For example, even if the sample is additionally injected 30 times using the solvent with the lower elution intensity, the materials trapped in the TC do not come out, but if the above solvent is not used, the materials trapped in the TC starts to escape after the sample is injected 7 to 10 times. This characteristic trapping process can be performed even without the concentration column (CC) in the on-line system according to the present invention.

Accordingly, the present invention may further provide an on-line system for improving a detection level of analytes by a liquid chromatograph (LC), the on-line system comprising: a first pump and a second pump for supplying a solvent; a liquid chromatograph (LC) including a separation column (SC) connected to the first pump; a trapping column (TC) for collecting the analytes separated from the separation column; a detector; and switching valves that communicate fluid with at least one of the first and second pumps, the separation column (SC), the trapping column (TC) and the detector, and have a plurality of ports, wherein the switching valves are connected to each other through a flow path and switch the fluid flow into an LC mode and a trapping mode by changing connection states of the ports included in each of the switching valves, wherein a first eluting solvent in the LC mode is supplied to the separation column (SC) through the first pump to separate the analytes, and then the LC mode is switched to the trapping mode, and a solvent having an elution intensity lower than that of the first eluting solvent can be supplied to the trapping column (TC) through the second pump to trap the analytes moving by flow of the first eluting solvent.

As described above, when components in a mixture sample are analyzed using the on-line system according to the present invention, concentration and additional solvent exchange are automated to facilitate analysis experiments by the LC and improve the detection level.

Further, unlike case of using a conventional fraction collector, there is no need to volatilize the eluting solvent, and loss of the analytes can be minimized.

Further, since the trapping and concentration processes are performed using a general LC column, any material that can be separated from the LC can be applied regardless of types thereof. Therefore, unlike the conventional SPE method, it is not necessary to install a cartridge having various types of fillers, and unlike the LVI, it is possible to overcome the limitation of applicable samples.

Furthermore, the on-line system according to the present invention is effective for concentrating the sample, and thus can be used not only for the mass spectrometry but also for concentrating other samples for analysis. In other words, according to the system of the present invention, it is possible not only to determine whether an analysis target is trapped from the detection result of the mass spectrum (when the analysis is not detected on the mass spectrum, the trap is considered to have been performed), but also to determine the trap time. Therefore, if concentration of the sample is required to determine a structure of the sample, it is possible to collect the sample in the trapping column and extract the analyzed components in the sample as they are. Accordingly, the analysis components can be concentrated and extracted with a small amount of the solvent, compared to the case of using the fraction collector in which the solvent must be volatilized.

Still furthermore, since the concentration process is performed in a closed system, harmful solvents are not exposed to the atmosphere, thereby reducing laboratory contamination.

Hereinafter, Examples will be described in detail to aid understanding of the present invention. However, the Examples according to the present invention may be modified in various other forms, and the scope of the present invention should not be construed to be limited to the following Examples. The Examples of the present invention are provided to explain the present invention to those of ordinary skill in the art more completely.

Example 1

A sample of an OLED material sample containing a component having a molecular weight of 506 Da was introduced into the on-line system as illustrated in FIG. 1 to perform an LC analysis of the sample. The above on-line system comprises a first pump and a second pump, a liquid chromatograph (LC) including a separation column (SC), a trapping column (TC), a concentration column (CC), a UV detector, a mass spectrometry detector (MS), and first to third switching valves having a plurality of ports.

Capcell pak $C_{18}$ (4.6 mm ID×50 mm L, particle size 3 μm, Shiseido) was used for all the three columns. A first eluting solvent for the LC was AN/THF (50:50) and $H_2O$/AN (100:1), a second eluting solvent for ionization was AN/TFA (100:0.1) and $H_2O$/TFA (100:0.1), and water was used as a solvent with a lower elution intensity.

In the above on-line system, a LC mode, a trapping mode and a concentration mode were performed while switching the connection states of the ports provided to the first to third switching valves as shown in Table 1 below. In this case, the eluting solvent was supplied at a flow rate of 1 ml/min using the first pump to flow it through the three columns of the SC, the TC and the CC, and water was additionally supplied to the TC and the CC at a flow rate of 0.25 ml/min using the second pump.

FIGS. 3 and 4 show LC/UV chromatograms (detection wavelength: 280 nm) and mass spectrum of trace components in the mixture analyzed according to operation mode of the online system in the above Example, respectively, wherein (a) SC extraction is the reference data that checked a size of a detection signal by injecting the sample once in the LC mode of the on-line system, (b) TC extraction is the result obtained without transferring the sample to the concentration column (CC) after trapping the sample 10 times, and (c) CC extraction is the result obtained by performing solvent exchange after concentration.

Table 2 below shows an increase rate of a signal compared to the reference data calculated from the detection results of FIGS. 3 and 4.

TABLE 2

|  | LC/UV | | MS |
|---|---|---|---|
|  | Peak Area | Peak Height | Signal Intensity |
| TC extraction | About 10 times | About 1.3 times | About 1.1 times |
| CC extraction | About 10 times | About 6 times | About 80 times |

From Table 2 above, in case of the TC extraction, the peak area in the UV chromatogram increased 10 times compared to the reference data and there was no loss of the analytes, but the height of the UV peak and the intensity of the mass spectrum were similar to the reference data, which can confirm that although the trapping was performed 10 times, there was little concentration effect.

Contrary to this, in case of the CC extraction, the UV peak area increased 10 times compared to the reference data, so that there was no loss of the analytes as well as the height of the UV peak and the intensity of the mass spectrum increased significantly. The increase in the UV peak height indicates a concentration effect by the on-column focusing using water (a solvent with a lower elution intensity) added when the analytes spread in the TC moves to the CC, and the increase in the intensity of the mass spectrum shows the result of addition of the concentration effect of the analytes and the improvement of the ionization efficiency by exchange of the eluting solvent. Concretely, considering the concentration effect (6-fold increase), an 80-fold increase in

TABLE 1

| Sequence | Time | 1st valve | 2nd valve | 3rd valve | Supply solvent | Remarks |
|---|---|---|---|---|---|---|
| SC Stabilization (blank run) | 0~end | Port 1-2 | — | — | 1st eluting solvent (1st pump) | LC mode |
| SC separation | 0~end | Port 1-2 | Port 1-6 | Port 5-6 | Water(2nd pump) | LC mode (Checking RT of analytes) |
| Trapping step (Performing 10 times) | 0~t1 | Port 1-2 | — | — | | LC mode |
| | t1~t2 | Port 1-10 | Port 1-6 | Port 5-6 | | Trapping mode |
| | t2~end | Port 1-2 | Port 1-6 | Port 5-6 | | LC mode |
| Concentration step | 0~t3 | Port 1-10 | Port 1-2 | Port 4-5 | | Concentration mode |
| | t3~end | Port 1-10 | Port 1-6 | | | — |
| Solvent exchange | 0~end | Port 1-10 | Port 1-6 | Port 4-5 | 2nd eluting solvent for ionization(1st pump) Water(2nd pump) | |
| Detection | 0~end | Port 1-10 | Port 1-2 | — | | Stopping operation of 2nd pump Connecting port 4 of 3rd valve | the mass spectral intensity can be seen as about 13-fold increase in the ionization efficiency.

Example 2

In order to compare a trapping efficiency according to the use of water as a solvent with a lower elution intensity, Capcell pak $C_{18}$ (4.6 mm ID×50 mm L, particle size 3 μm, Shiseido) was used as a separation column (SC) and a trapping column (TC), and a LC mode and a trapping mode were performed in the same manner as in Example 1 using the on-line system that does not include a concentration column (CC). In this case, AN/THF (50:50) and $H_2O$/AN (100:1) were used as a first eluting solvent, and water was used as the solvent with the lower elution intensity. The results extracted from the trapping column by injecting the same sample as that of Example 1 30 times were shown in Table 3 below.

TABLE 3

| | LC/UV(peak area)[1)] |
|---|---|
| Water added | About 30-fold |
| No water added | About 7-fold |

[1)]expressed as a multiple of the reference data that confirmed a size of the detection signal by injecting the sample once.

It can be seen from Table 3 above that when water as the solvent having the lower elution intensity was added between the separation column (SC) and the trapping column (CC), the peak area was increased by 30-fold (that is, all the samples injected 30 times were trapped), whereas when no water was added, the peak area was only 7-fold (that is, only an amount that can be collected by injecting the samples 7 times was trapped). In other word, in case no water was added, when the sample was injected 8 times the material trapped by injecting the sample first exited the trap column (TC).

What are claimed are:

1. An on-line system for improving a detection level of analytes by a liquid chromatography (LC), the on-line system comprising:
    a first pump and a second pump for supplying a solvent;
    a liquid chromatography (LC) including a separation column (SC) connected to the first pump;
    a trapping column (TC) for collecting the analytes separated from the separation column;
    a concentration column (CC) for concentrating the analytes collected in the trapping column (TC);
    a detector; and
    first to third switching valves that communicate fluid with at least one of the first and second pumps, the separation column (SC), the trapping column (TC), the concentration column (CC) and the detector, and wherein each of the first to third switching valves has a plurality of ports,
    wherein the first to third switching valves are connected to each other through a flow path and configured to switch the fluid flow to an LC mode, a trapping mode or a concentration mode by changing connection states of the plurality of ports included in each of the switching valves,
    wherein a first eluting solvent in the LC mode is supplied to the separation column (SC) through the first pump to separate the analytes, and then the LC mode is sequentially switched to the trapping mode and the concentration mode, and a solvent having an elution intensity lower than that of the first eluting solvent is supplied to the trapping column (TC) and the concentration column (CC) through the second pump to trap and concentrate the analytes moving by flow of the first eluting solvent, and
    wherein after the analytes are trapped and concentrated by flow of the first eluting solvent, the first pump supplies a second eluting solvent for ionization of the analytes through solvent exchange, whereas operation of the second pump is stopped so that the analytes concentrated in the concentration column (CC) by the second eluting solvent are detected by introducing them into the detector.

2. The on-line system according to claim 1, wherein the first switching valve has 10 ports and the second and third switching valves have 6 ports, respectively, the ports being arranged at intervals around each of the first to third valves,
    wherein the first switching valve includes a port in fluid communication with the separation column, a port in fluid communication with the detector, a port in fluid communication with the second switching valve, a port in fluid communication with the trapping column (TC), and a port for disposal of components other than the analytes and solvents,
    the second switching valve includes a port in fluid communication with the first switching valve, a port in fluid communication with the concentration column (CC), and a port for disposal of components other than the analytes and solvents, and
    the third switching valve includes a port in fluid communication with the second switching valve and the concentration column (CC), a port in fluid communication with the second pump, and a port in fluid communication with the first switching valve and the trapping column (TC).

3. The on-line system according to claim 1, wherein the plurality of ports of the first switching valve comprises:
    a port 1 in fluidic communication with at least the separation column (SC);
    a port 2 in fluidic communication with at least the detector;
    a port 7 in fluidic communication with at least the trapping column (TC);
    a port 8 at least for disposal of components other than the analytes and the first eluting solvent;
    a port 9 at least for disposal of components other than the analytes and the first eluting solvent; and
    a port 10 in fluidic communication with at least a port 6 of the third switching valve;
    wherein the port 6 of the third switching valve is in fluidic communication with at least a port 5 of the third switching valve,
    wherein the port 5 of the third switching valve is in fluidic communication with at least the second pump, and
    wherein the LC mode is operated such that ports 1 and 2 of the first switching valve are connected to each other to separate the analytes while the first eluting solvent supplied through the first pump passes through the separation column (SC), and then the separated analytes and the first eluting solvent are introduced into the detector directly along a flow path connected to the ports 1 and 2 of the first switching valve, whereas after a solvent having a lower elution intensity supplied through the second pump passes a flow path connected to ports 9 and 10 of the first switching valve or the trapping column (TC) through a flow path connected to ports 5 and 6 of the third switching valve, the solvent having the lower elution intensity is discarded along a flow path connected to ports 7 and 8 of the first switching valve.

4. The on-line system according to claim 1, wherein the plurality of ports of the first switching valve comprises:
a port 1 in fluidic communication with at least the separation column (SC);
a port 3 in fluidic communication with at least a port 6 of the second switching valve;
a port 6 in fluidic communication with at least a port 1 of the second switching valve; and
a port 10 in fluidic communication with at least a port 6 of the third switching valve,
wherein the port 6 of the third switching valve is in fluidic communication with at least a port 5 of the third switching valve,
wherein the port 5 of the third switching valve is in fluidic communication with at least the second pump, and
wherein the trapping mode is operated such that ports 1 and 10 of the first switching valve, ports 1 and 6 of the second switching valve and ports 5 and 6 of the third switching valve are connected at a point of time when the analytes pass through the separation column (SC), and a solvent having a lower elution intensity supplied by the second pump flows into the trapping column (TC) through a flow path connected to the ports 5 and 6 of the third switching valve while the analytes and a first eluting solvent flow into the trapping column (TC) along a flow path connected to the port 10 of the first switching valve, whereby the analytes are collected in the trapping column (TC) by the solvent having the lower elution intensity, and the first eluting solvent and the solvent having the lower elution intensity pass through the trapping column (TC).

5. The on-line system according to claim 4, wherein the plurality of ports of the first switching valve further comprises:
a port 2 in fluidic communication with at least the detector; and
a port 7 in fluidic communication with at least the trapping column (TC), and
wherein the first eluting solvent and the solvent having the lower elution intensity which are passed through the trapping column (TC) are detected by moving them into the detector along a flow path connected to ports 6 and 7 of the first switching valve, a flow path connected to the ports 1 and 6 of the second switching valve and a flow path connected to the ports 2 and 3 of the first switching valve.

6. The on-line system according to claim 1, wherein the plurality of ports of the first switching valve comprises:
a port 1 in fluidic communication with at least the separation column (SC);
a port 6 in fluidic communication with at least a port 1 of the second switching valve;
a port 7 in fluidic communication with at least the trapping column (TC); and
a port 10 in fluidic communication with at least a port 6 of the third switching valve,
wherein the plurality of ports of the second switching valve comprises a port 2 in fluidic communication with at least the concentration column (CC),
wherein the plurality of ports of the third switching valve comprises:
a port 4 in fluidic communication with at least the concentration column (CC); and
a port 5 in fluidic communication with at least the second pump, and
wherein the concentration mode is operated such that ports 1 and 10 of the first switching valve, ports 1 and 2 of the second switching valve and ports 4 and 5 of the third switching valve are connected, and the solvent having the lower elution intensity supplied by the second pump flows into the concentration column (CC) through a flow path connected to the ports 4 and 5 of the third switching valve while the analytes collected in the trapping column (TC) flow into the concentration column (CC) along the flow path connected to the ports 6 and 7 of the first switching valve and a flow path connected to the ports 1 and 2 of the second switching valve, whereby the analytes are concentrated in the concentration column (CC) by the solvent of the lower elution intensity, and the solvent of the lower elution intensity and the first eluting solvent pass through the concentration column (CC).

7. The on-line system according to claim 6, wherein the plurality of ports of the first switching valve comprises:
a port 2 in fluidic communication with at least the detector; and
a port 3 in fluidic communication with at least a port 6 of the second switching valve,
wherein the plurality of ports of the second switching valve further comprises a port 5 in fluidic communication with at least the concentration column (CC), and
wherein the solvent of the lower elution intensity and the first eluting solvent passing through the concentration column (CC) are detected by moving them into the detector along a flow path connected to the ports 5 and 6 of the second switching valve and a flow path connected to the ports 2 and 3 of the first switching valve.

8. The on-line system according to claim 1, wherein the plurality of ports of the first switching valve comprises:
a port 1 in fluidic communication with at least the separation column (SC); and
a port 10 in fluidic communication with at least the trapping column (TC),
wherein the plurality of ports of the second switching valve comprises:
a port 1 in fluidic communication with at least the trapping column (TC); and
a port 2 in fluidic communication with at least the concentration column (CC),
wherein the concentration column (CC) is in fluidic communication with at least the detector, and
wherein after the concentration mode, the ports 1 and 10 of the first switching valve and the ports 1 and 2 of the second switching valve are connected and the second pump and the third switching valve are blocked, so that the concentrated analytes flow into the detector by the second eluting solvent for ionization of the analytes supplied to the concentration column (CC) through the separation column (SC) and the trapping column (TC) by the first pump.

9. The on-line system according to claim 1, wherein the detector includes a UV detector or a mass spectrometry detector (MS).

10. The on-line system according to claim 1, wherein the first pump supplies the first eluting solvent at a flow rate of 0.1 to 2 ml/min, and the second pump supplies the solvent having the lower elution intensity at a flow rate of less than 0.5 ml/min.

11. A method for analyzing trace components in a mixture by a LC using the on-line system of claim 1, the method comprising:
- (S1) in a LC mode of the on-line system, after passing a mixture sample through a separation column (SC) to separate and detect with a first eluting solvent and checking a retention time (RT) of trace components to be analyzed in the sample in the separation column from the detection result, setting a time (t1) at which the trace components start to exit the separation column (SC) and a time (t2) at which the trace components completely exit the separation column (SC);
- (S2) at the start of the time (t1), switching the on-line system to a trapping mode and additionally supplying a solvent having an elution intensity lower than that of the first eluting solvent to a flow path directing to a trapping column (TC), so that the trace components in the sample exiting the separation column (SC) are collected in the trapping column (TC) until the time (t2) by the solvent having the lower elution intensity (trapping step); and
- (S3) after completing the trapping, switching the on-line system to a concentration mode and additionally supplying the solvent having the lower elution intensity to a flow path directing to a concentration column (CC), so that the trace components trapped in the trapping column (TC) are concentrated in the concentration column (CC).

12. The method according to claim 11, further comprising, after concentration of the trace components, supplying a second eluting solvent for ionizing the trace components to the concentration column (CC) through the separation column (SC) and the trapping column (TC) to exchange the first eluting solvent filled in the above columns and their connection flow paths with the second eluting solvent, so that the trace components concentrated by the second eluting solvent are detected by introducing them into the detector.

13. The method according to claim 11, wherein the trapping of the trace components in step (S2) is performed 2 to 30 times continuously.

14. The method according to claim 11, wherein a time (t3) when the trace components exit the trapping column (TC) and are concentrated in the concentration column (CC) is RT+1 min to RT+1.5 min.

15. An on-line system for improving a detection level of analytes by a liquid chromatography (LC), the on-line system comprising:
- a first pump and a second pump for supplying a solvent;
- a liquid chromatography (LC) including a separation column (SC) connected to the first pump;
- a trapping column (TC) for collecting the analytes separated from the separation column;
- a detector; and
- switching valves that communicate fluid with at least one of the liquid chromatography (LC) including the separation column (SC) connected to the first pump, the trapping column (TC) for collecting the analytes separated from the separation column, the detector, the first and second pumps, or the separation column (SC), and the switching valves have a plurality of ports,
- wherein the switching valves are connected to each other through a flow path and switch the fluid flow to an LC mode and a trapping mode by changing connection states of the ports included in each of the switching valves,
- wherein a first eluting solvent in the LC mode is supplied to the separation column (SC) through the first pump to separate the analytes, and then the LC mode is switched to the trapping mode, and a solvent having an elution intensity lower than that of the first eluting solvent is supplied to the trapping column (TC) through the second pump to trap the analytes moving by flow of the first eluting solvent, and
- wherein after the analytes are trapped by flow of the first eluting solvent, the first pump supplies a second eluting solvent for ionization of the analytes through solvent exchange, whereas operation of the second pump is stopped so that analytes concentrated by the second eluting solvent are detected by introducing them into the detector.

* * * * *